United States Patent
Oh et al.

(10) Patent No.: US 7,494,523 B2
(45) Date of Patent: Feb. 24, 2009

(54) MULTI-CYCLONE DUST SEPARATOR

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 542 days.

(21) Appl. No.: 11/267,357

(22) Filed: Nov. 4, 2005

(65) Prior Publication Data

US 2006/0230716 A1 Oct. 19, 2006

Related U.S. Application Data

(60) Provisional application No. 60/666,144, filed on Mar. 29, 2005.

(30) Foreign Application Priority Data

May 4, 2005 (KR) .................. 10-2005-0037548

(51) Int. Cl.
B01D 45/12 (2006.01)
(52) U.S. Cl. ................... 55/343; 55/349; 55/459.1; 55/DIG. 3
(58) Field of Classification Search ............. 55/343, 55/346, 349, 459.1, DIG. 3
See application file for complete search history.

(56) References Cited

U.S. PATENT DOCUMENTS

| | | | |
|---|---|---|---|
| 2005/0050678 A1 | 3/2005 | Oh et al. | 15/353 |
| 2006/0230722 A1* | 10/2006 | Oh et al. | 55/345 |

FOREIGN PATENT DOCUMENTS

| | | |
|---|---|---|
| GB | 2372468 | 8/2002 |
| GB | 2381484 | 5/2003 |
| GB | 2406065 | 3/2005 |
| WO | WO01/95780 A2 | 12/2001 |
| WO | WO0195780 A3 | 12/2001 |

OTHER PUBLICATIONS

British Combined Search and Examination Report issued Mar. 17, 2006 with respect to corresponding British Application No. 0525149.1 filed on Dec. 9, 2005.

* cited by examiner

Primary Examiner—Robert A Hopkins
(74) Attorney, Agent, or Firm—Ohlandt, Greeley, Ruggiero & Perle, LLP.

(57) ABSTRACT

A multi-cyclone dust separator according to an embodiment of the present invention comprises a first cyclone unit having a first cyclone chamber and a first dust receptacle enclosing a circumference of the first cyclone chamber; and a second cyclone unit disposed below the first cyclone unit and having a plurality of second cyclone chambers and a second dust receptacle disposed under the second cyclone chambers to collect dust.

8 Claims, 4 Drawing Sheets

MULTI-CYCLONE DUST SEPARATOR

CROSS-REFERENCE TO RELATED APPLICATIONS

This application claims the benefit of U.S. Provisional Application No. 60/666,144 filed on Mar. 29, 2005 in the United States Patent and Trademark Office, and Korean Patent Application No. 2005-37548 filed on May 4, 2005 in the Korean Intellectual Property Office, the entire disclosures of which are incorporated herein by reference.

BACKGROUND OF THE INVENTION

1. Field of the Invention

The present invention relates to a multi-cyclone dust separator.

2. Description of the Related Art

Generally, a cyclone dust separator separates dust and dirt from air using a centrifugal force and then discharges the air to the outside while collecting the dust and dirt in a dedicated dust collecting chamber. Such a cyclone dust separator is nowadays widespread since it is nearly permanent, whereas a conventional dust bag has a relatively short lifespan. In order to enhance dust suction efficiency of the cyclone dust separator, a multi-cyclone dust separator has been introduced and developed, which comprises a first cyclone chamber for separating relatively larger dust and a plurality of second cyclones for separating relatively smaller dust, in a serial or a parallel fashion.

As an example, a multi-cyclone dust separator is disclosed in Korean Patent Application Nos. 10-2003-0062520, 10-2003-0063211 and 10-2003-0063212 (filed by the present applicant), which comprises a cyclone body which includes a first cyclone chamber and a plurality of second cyclone chambers formed on a circumference of the first cyclone chamber, and a dust receptacle which includes a first dust receptacle for collecting the dust separated by the first cyclone chamber and a second dust receptacle for collecting the dust separated by the second cyclone chamber. According to the above structure, the relatively larger dust is separated primarily by the first cyclone chamber and collected in the first dust receptacle while the relatively smaller dust is separated secondarily by the second cyclone chamber and collected in the second dust receptacle. As a result, efficiency of removing the dust can be improved, compared to a uni-cyclone dust separator.

However, according to the conventional multi-cyclone dust separator by the present applicant, since an air induction path that guides the air into the first cyclone chamber is formed necessarily through the circumference of the first cyclone chamber, the second cyclone chambers formed on the circumference of the first cyclone chamber cannot be overlappingly formed with the air induction path. That is, the second cyclone chambers can be formed in the rest space after forming the air induction path and therefore, increase in the number or volume of the second cyclone chambers, for better suction efficiency, is restricted. In addition, in the conventional multi-cyclone dust separator, the second dust receptacle for collecting dust separated by the second cyclone chambers is disposed around the first dust receptacle for collecting dust separated by the first cyclone chamber. Therefore, the second dust receptacle is formed in the rest space after forming the first dust receptacle and this restricts the size of the second dust receptacle in comparison to that of the first dust receptacle.

SUMMARY OF THE INVENTION

An aspect of the present invention is to solve at least the above problems and/or disadvantages and to provide at least the advantages described below. Accordingly, an aspect of the present invention is to provide a multi-cyclone dust separator in which the number of second cyclone chambers can be increased in the same volume or circumference as a first cyclone chamber, thereby being improved in dust-suction efficiency.

Another aspect of the present invention is to provide a multi-cyclone dust separator having an increased space for a second dust receptacle.

In order to achieve the above-described aspects of the present invention, there is provided a multi-cyclone dust separator comprising a first cyclone unit having a first cyclone chamber and a first dust receptacle enclosing a circumference of the first cyclone chamber; and a second cyclone unit disposed below the first cyclone unit and having a plurality of second cyclone chambers and a second dust receptacle disposed under the second cyclone chambers to collect dust.

An air is drawn in through a flank of a second outer wall of the second cyclone unit, passed through the first cyclone unit formed at an upper part and the second cyclone unit formed at a lower part, and discharged out through a flank of the second outer wall of the second cyclone unit. Alternatively, the air may be drawn in through a flank of a second outer wall of the second cyclone unit, passed through the first cyclone unit formed at an upper part and the second cyclone unit formed at a lower part, and discharged out through a second bottom of the second outer wall of the second cyclone unit.

The second cyclone chambers are arranged along a circumference of a second ceiling of the second cyclone unit and inserted into the second dust receptacle. The multi-cyclone dust separator may further comprise an air induction path penetrating the second outer wall of the second cyclone unit, at a portion lower than the second cyclone chambers, and connected to the first cyclone chamber.

Preferably, the multi-cyclone dust separator further comprises a guide path connecting the air induction path and the first cyclone chamber; a first discharge pipe mounted to a first bottom of the first cyclone chamber; a plurality of connection paths connecting the first discharge pipe with the second cyclone chambers; a second discharge pipe mounted at an upper part of the second cyclone chambers; a stagnation room temporarily holding the air passed through the second discharge pipe; and an air discharge path connected to one side of the stagnation room. Here, the stagnation room is disposed between the first bottom of the first cyclone unit and the second ceiling of the second cyclone unit. The air discharge path penetrates the second bottom of the second cyclone unit.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
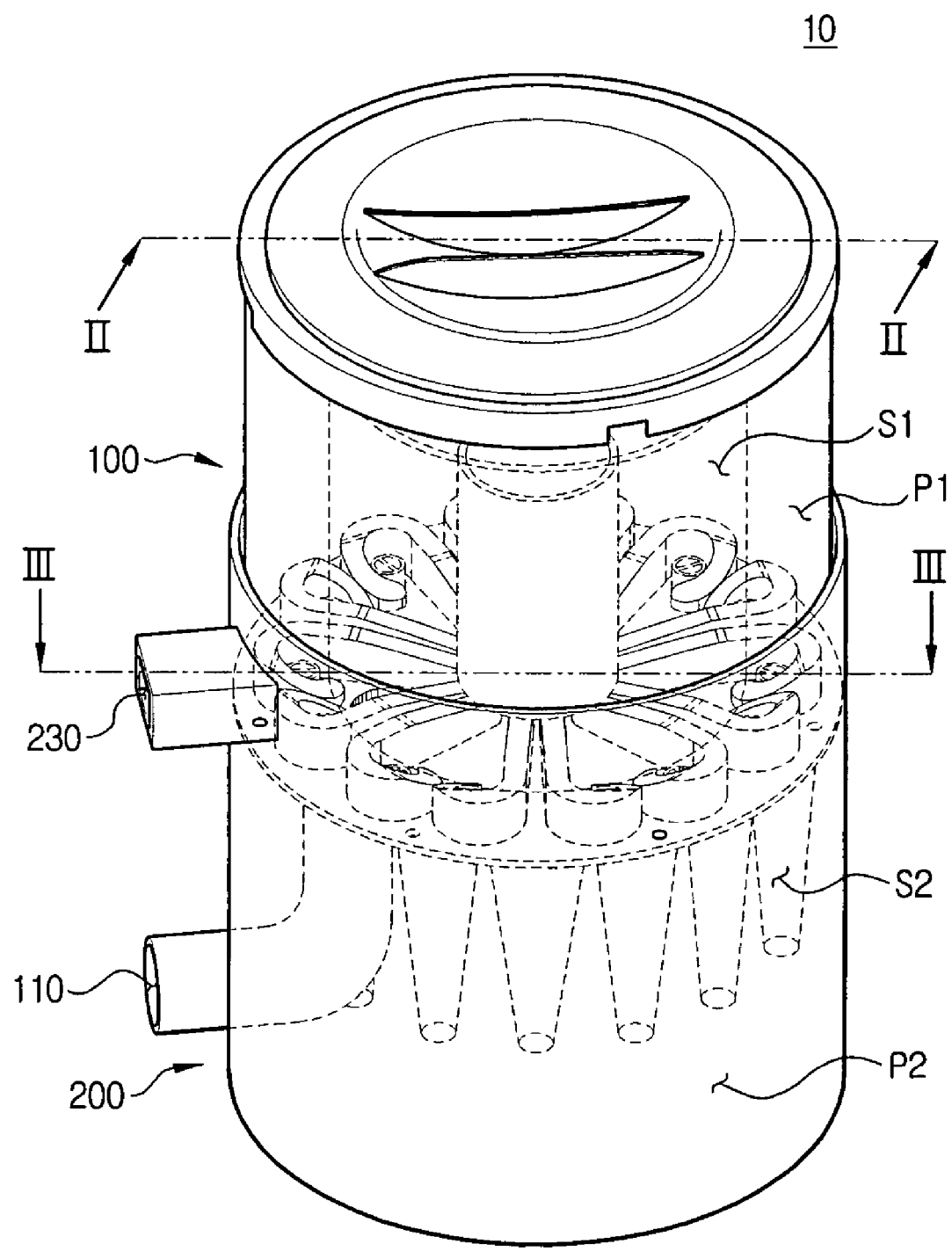
FIG. 1 is a perspective view of a multi-cyclone dust separating apparatus according to an embodiment of the present invention.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
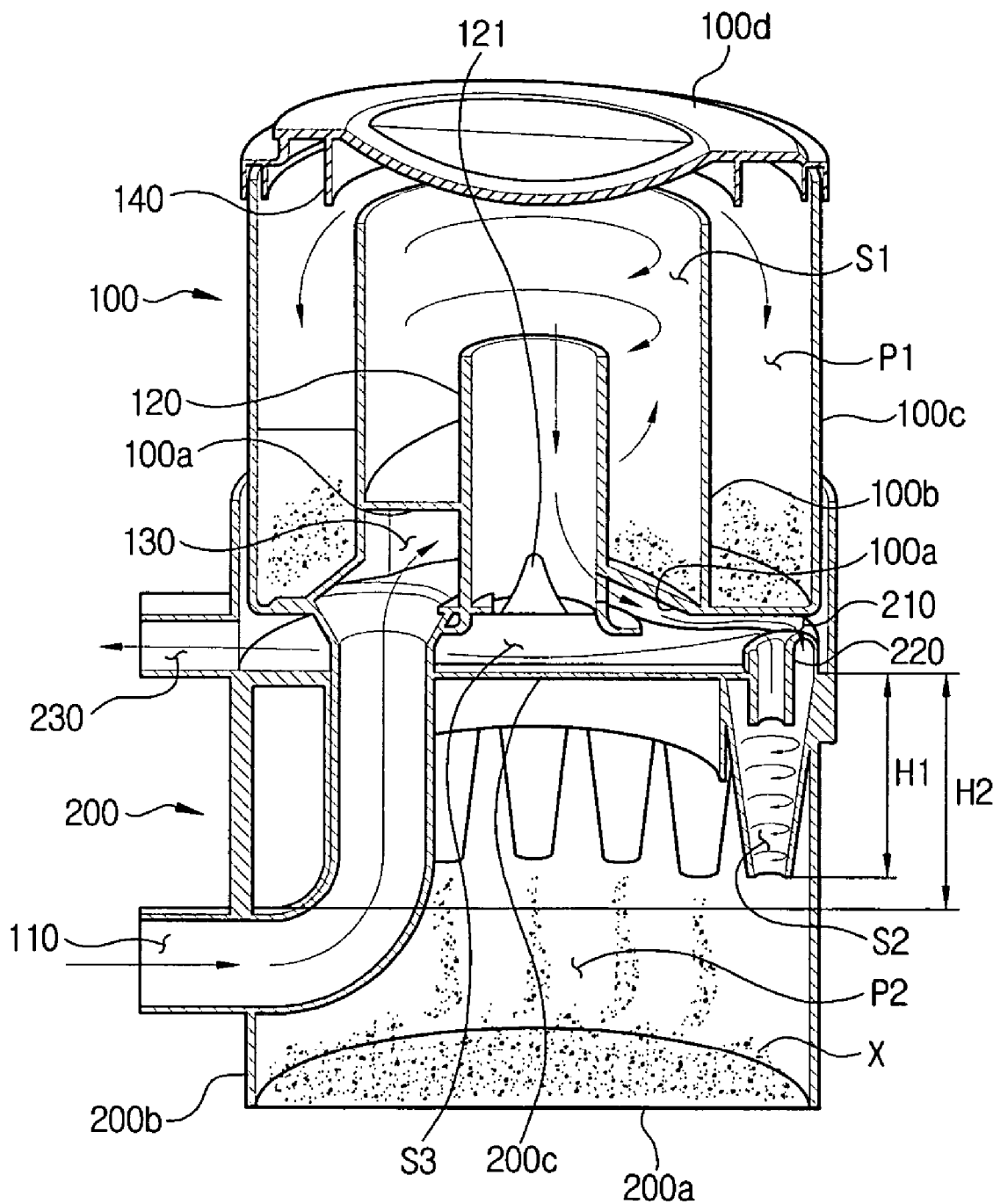
FIG. 2 is a sectional view of FIG. 1 cut along line II-II.

In FIG. 2, illustration of second cyclones are partly omitted for conciseness. Arrows in the drawings denote air flow and 'X' denotes dust.

Referring to FIGS. 1 and 2, a multi-cyclone dust separator 10 comprises a first cyclone unit 100 at an upper part and a second cyclone unit 200 at a lower part.

The first cyclone unit 100 primarily separates dust included in an air drawn in through an air induction path 110 from the outside and to this end, comprises a first cyclone chamber S1 and a first dust receptacle P1.

The first cyclone chamber S1 is a space defined by a first bottom 100a and an inner wall 100b of the first cyclone unit 100. The first cyclone chamber S1 has a first discharge pipe 120 penetrating the first bottom 100a in the center thereof. The air separated from dust by the first cyclone chamber S1 is discharged to the second cyclone chamber S2, passing through the first discharge pipe 120 and a connection path 210. At the center of the first discharge pipe 120, an inducing cone 121 is formed to guide the air toward the connection path 210.

A guide path 130 is formed below the first bottom 100a. The guide path 130 is connected by one end to the air induction path 110 and by the other end to the first cyclone chamber S1, as spirally ascending along a circumference of the first discharge pipe 120. The air drawn in through the air induction path 110 is guided into the first cyclone chamber S1 by a centrifugal force through the guide path 130.

The air induction path 110 is formed on a flank of the second cyclone unit 200 to induce dust-laden external air into the first cyclone chamber S1. To avoid interference with the second cyclone chamber S2, the air induction path 110 is disposed apart from a top of the second cyclone unit 200 by a predetermined height H2 which is sufficiently greater than a height H1 of the second cyclone chamber S2. The air induction path 110 penetrates an outer wall 200b of the second cyclone unit 200, bent toward a second ceiling 200c and is finally connected to the guide path 130 through the second ceiling 200c.

Figure 3:
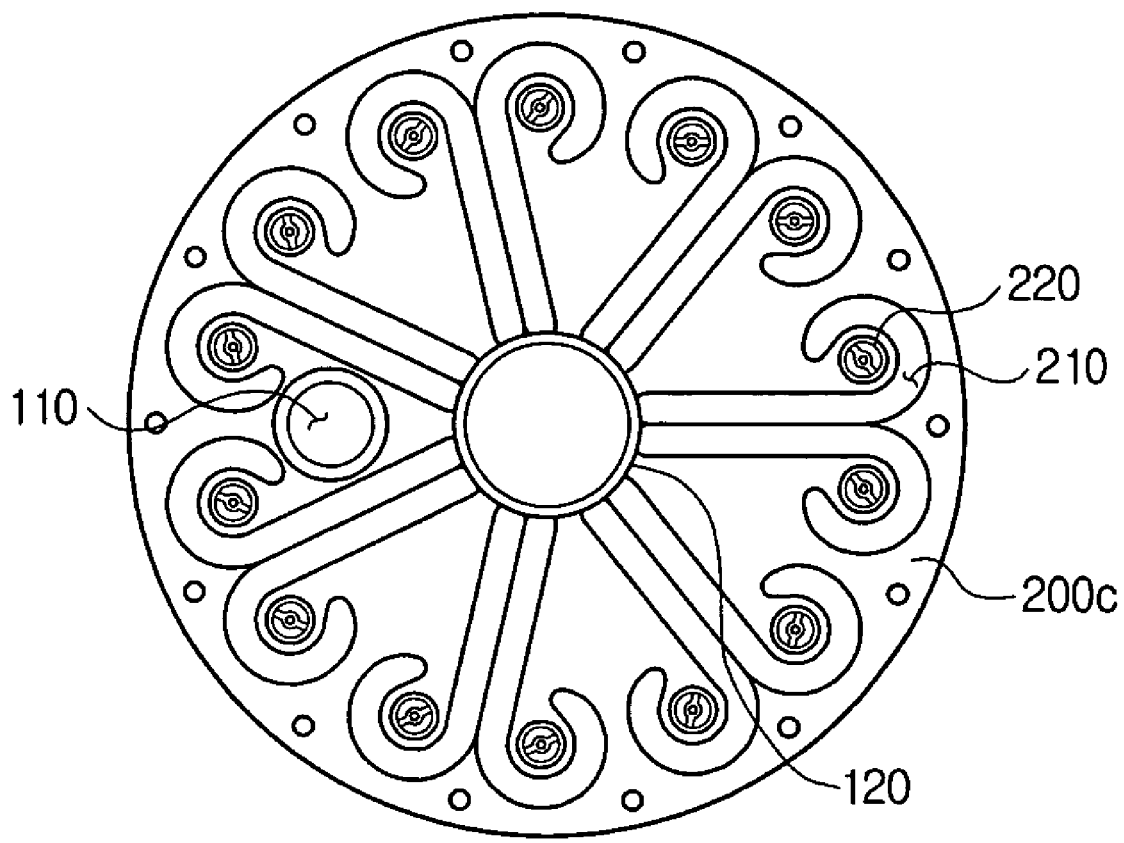
FIG. 3 is a sectional view of FIG. 1 cut along line III-III.

Thus, since the air induction path 110 is disposed lower than the second cyclone chamber S2, the second cyclone chambers S2 can be arranged at certain intervals without interference by the air induction path 110, as shown in FIG. 3. That is, the second cyclone chambers S2 do not have to be formed to avoid the air induction path 110 and therefore, the number of the second cyclone chambers S2 can be increased. By increasing the number of second cyclone chambers S2, dust suction efficiency can be improved.

The first dust receptacle P1, being defined by the inner wall 100b, a first outer wall 100c and the first bottom 100a, circumferentially encloses of the first cyclone chamber S1. The dust separated by the first cyclone chamber S1 is collected into the first dust receptacle P1.

A backflow prevention rib 140 protrudes from a lower part of the first ceiling 100d toward the first dust receptacle P1. Being disposed between the first outer wall 100c and the inner wall 100b, the backflow prevention rib 140 restrains the dust collected in the first dust receptacle P1 from flowing back to the first cyclone chamber S1.

The second cyclone unit 200 secondarily separates dust remaining after passing through the first cyclone chamber S1. The second cyclone unit 200 is connected to a lower part of the first cyclone unit 100 and comprises the second cyclone chamber S2 and a second dust receptacle P2.

Referring to FIGS. 2 and 3, the second cyclone chamber S2 is shaped as a truncated cone and inserted in the second cyclone chamber P2. In this embodiment, fourteen second cyclone chambers S2 are arranged along the circumference of the second ceiling 200c toward the second dust receptacle P2. As described above, the number of the second cyclone chambers S2 can be increased for the same space or the same circumference of the first cyclone chamber 100, thereby enhancing the suction efficiency.

The connection path 210 radially extends from the center of the second ceiling 200c and connected to the first discharge pipe 120 by one end and to the second cyclone chamber S2 by the other end. The air being discharged from the first discharge pipe 120 is drawn into the second cyclone chamber S2 through the connection path 210 by the centrifugal force.

As the air drawn into the second cyclone chamber S2 ascends and descends in a rotating manner in the second cyclone chamber S2, the remaining dust not yet separated by the first cyclone chamber S1 is further separated. The air further cleaned is moved up and discharged out through a second discharge pipe 220 disposed at an upper part of the second cyclone chamber S2, while the dust separated from the air is collected in the second dust receptacle P2.

The second discharge pipe 220 is disposed at an upper part of the second cyclone chamber S2 and partly inserted in the second cyclone chamber S2 by a predetermined length.

A stagnation room S3 is formed between the first bottom 100a of the first cyclone unit 100 and the second ceiling 200c of the second cyclone unit 200 to temporarily hold the air discharged from the second discharge pipe 220.

An air discharge path 230 is formed on a flank or side of the second cyclone unit 200, penetrating the outer wall 200b of the second cyclone unit 200 and connected to the stagnation room S3. The air held in the stagnation room S3 is discharged to the outside through the air discharge path 230.

Figure 4:
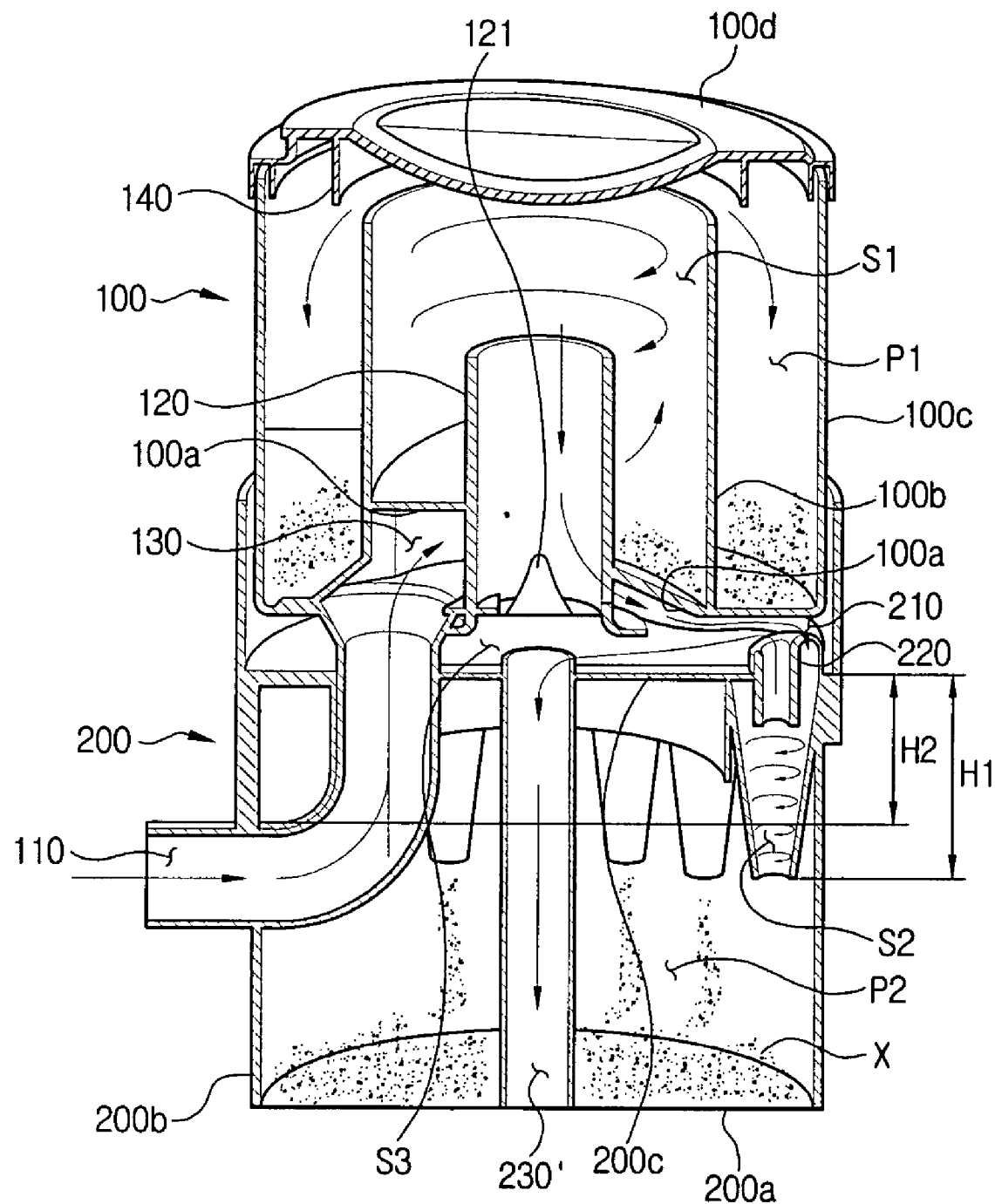
FIG. 4 is a view showing another arrangement of an air discharge path, according to another embodiment of the present invention.

FIG. 4 shows another example of arrangement of the air discharge path. Referring to FIG. 4, the air discharge path 230' penetrates the bottom 220a of the second cyclone unit 200. When a suction source (not shown) is mounted at a lower part of the second bottom 200a in this state, a distance between the suction source (not shown) and the multi-cyclone dust separator 10 can be minimized, thereby reducing loss of the suction force.

Referring to FIG. 2, the second dust receptacle P2 is formed under the second cyclone chamber S2 to collectively receive the dust separated by the second cyclone chamber S2. More specifically, the second dust receptacle P2 is defined by the second bottom 200a, the second outer wall 200b and the second ceiling 200c so as to include the second cyclone chamber S2. By thus disposing the second dust receptacle P2 under the second cyclone chamber S2, volume of the second dust receptacle P2 can be enlarged.

Hereinbelow, the operation of the multi-cyclone dust separator 10 according to an embodiment of the present invention will be described with reference to the drawings.

Referring to FIG. 2, as the suction force is generated by the suction source (not shown), the dust-laden air is drawn into the first cyclone chamber S1, passing through the air induction path 110 and the guide path 130. The dust included in the drawn-in air is primarily separated by a centrifugal force in the first cyclone chamber S1 and collected in the first dust receptacle P1. Here, the dust collected in the first dust receptacle P1 is restrained from flowing back to the first cyclone chamber S1 by the backflow prevention rib 140.

The dust-separated air is then drawn into the second cyclone chamber S2, passing through the first discharge pipe 120 and the connection path 210. Here, the air is fluently guided to the connection path 210 by help of the inducing cone 121. Further, since the connection path 210 is tangentially connected to the flank of the second cyclone chamber S2, the air passed through the connection path 210 is centrifugally drawn into the second cyclone chamber S2.

The dust still included in the air drawn into the second cyclone chamber S2 is secondarily separated by the centrifugal force and collected in the second dust receptacle P2. The secondarily cleaned air ascends to be discharged from the second discharge pipe 220, is temporarily collected in the stagnation room S3, and is discharged from the multi-cyclone dust separator 10 through the air discharge path 230.

As can be appreciated from the above description of the multi-cyclone dust separator 10 according to embodiments of the present invention, firstly, the second cyclone chambers S2 are disposed below the first cyclone chamber S1 and the air induction path 110 is connected to the first cyclone chamber S1 without interference by the second cyclone chambers S2. Accordingly, in the same volume or with the same circumference of the first cyclone chamber S1, the number of the second cyclone chambers S2 can be increased, thereby improving the suction efficiency.

Secondly, the dust collecting space can be enlarged by disposing the second dust receptacle P2 below the second cyclone chambers S2.

Thirdly, by forming the air discharge path 230 in connection with the bottom of the second cyclone chambers S2, the distance from the suction source (not shown) to the multi-cyclone dust separator 10 can be minimized, thereby restraining loss of the suction force.

While the invention has been shown and described with reference to certain embodiments thereof, it will be understood by those skilled in the art that various changes in form and details may be made therein without departing from the spirit and scope of the invention as defined by the appended claims.

What is claimed is:

1. A multi-cyclone dust separator comprising:
   a first cyclone unit having a first cyclone chamber and a first dust receptacle enclosing a circumference of the first cyclone chamber; and
   a second cyclone unit disposed below the first cyclone unit and having a plurality of second cyclone chambers and a second dust receptacle disposed under the plurality of second cyclone chambers to collect dust.

2. The multi-cyclone dust separator of claim 1, wherein an air is drawn in through a flank of a second outer wall of the second cyclone unit, passed through the first cyclone unit formed at an upper part and the second cyclone unit formed at a lower part, and discharged out through the flank of the second outer wall of the second cyclone unit.

3. The multi-cyclone dust separator of claim 1, wherein an air is drawn in through a flank of a second outer wall of the second cyclone unit, passed through the first cyclone unit formed at an upper part and the second cyclone unit formed at a lower part, and discharged out through a second bottom of the second outer wall of the second cyclone unit.

4. The multi-cyclone dust separator of claim 1, wherein the plurality of second cyclone chambers are arranged along a circumference of a second ceiling of the second cyclone unit and inserted into the second dust receptacle.

5. The multi-cyclone dust separator of claim 4, further comprising an air induction path penetrating a second outer wall of the second cyclone unit, at a portion lower than the second cyclone chambers, and connected to the first cyclone chamber.

6. The multi-cyclone dust separator of claim 5, further comprising:
   a guide path connecting the air induction path and the first cyclone chamber;
   a first discharge pipe mounted to a first bottom of the first cyclone chamber;
   a plurality of connection paths connecting the first discharge pipe with the plurality of second cyclone chambers;
   a second discharge pipe mounted at an upper part of the second cyclone chambers;
   a stagnation room temporarily holding the air passed through the second discharge pipe; and
   an air discharge path connected to one side of the stagnation room.

7. The multi-cyclone dust separator of claim 6, wherein the stagnation room is disposed between the first bottom of the first cyclone unit and the second ceiling of the second cyclone unit.

8. The multi-cyclone dust separator of claim 6, wherein the air discharge path penetrates the second bottom of the second cyclone unit.

* * * * *